(12) United States Patent
Navarro-Losada et al.

(10) Patent No.: US 10,099,513 B2
(45) Date of Patent: Oct. 16, 2018

(54) TIRE COMPRISING A TREAD MADE UP OF SEVERAL ELASTOMERIC COMPOUNDS

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Claudia Navarro-Losada, Clermont-Ferrand (FR); Benjamin Quantinet, Clermont-Ferrand (FR); Gilles Godeau, Clermont-Ferrand (FR); Pierre Tregouet, Clermont-Ferrand (FR)

(73) Assignees: Compagnie Generale Des Etablissements Michelin, Clermont-Ferrand (FR); Michelin Recherche Et Technique, S.A., Granges-Paccot (CH)

( * ) Notice: Subject to any disclaimer, the term of this patent is extended or adjusted under 35 U.S.C. 154(b) by 182 days.

(21) Appl. No.: 14/650,874

(22) PCT Filed: Dec. 2, 2013

(86) PCT No.: PCT/EP2013/075243
§ 371 (c)(1),
(2) Date: Jun. 10, 2015

(87) PCT Pub. No.: WO2014/090619
PCT Pub. Date: Jun. 19, 2014

(65) Prior Publication Data
US 2015/0314650 A1 Nov. 5, 2015

(30) Foreign Application Priority Data

Dec. 10, 2012 (FR) ..................... 12 61828

(51) Int. Cl.
*B60C 11/00* (2006.01)
*B60C 5/00* (2006.01)
*B60C 1/00* (2006.01)

(52) U.S. Cl.
CPC .......... *B60C 11/005* (2013.01); *B60C 1/0016* (2013.01); *B60C 5/00* (2013.01);
(Continued)

(58) Field of Classification Search
CPC ......... B60C 2011/0025; B60C 11/0075; B60C 11/00; B60C 11/0016; B60C 11/005; B60C 11/0058
See application file for complete search history.

(56) References Cited

U.S. PATENT DOCUMENTS 5,046,542 A  9/1991 Ohta et al.
6,247,512 B1 * 6/2001 Radulescu ............. B60C 11/18
                                                                152/209.5
(Continued)

FOREIGN PATENT DOCUMENTS

DE  102011001133 A1 * 9/2012 ........... B60C 1/0016
DE  102011001133 A1  9/2012
(Continued)

OTHER PUBLICATIONS

International Search Report PCT/EP2013/075243 dated Jan. 13, 2014.

*Primary Examiner* — Joseph S Del Sole
*Assistant Examiner* — Cedrick S Williams
(74) *Attorney, Agent, or Firm* — Dickinson Wright PLLC

(57) ABSTRACT

A tire with a radial carcass reinforcement, having a crown reinforcement, itself capped radially by a tread connected to two beads by two sidewalls, having at least two radially superposed layers of elastomeric compounds; a first layer, forming the radially outer part of the tread, has a first elastomeric compound having a modulus G* greater than 1.8 MPa, a second layer of elastomeric compounds radially on the inside of and in contact with the said first layer of elastomeric compound has at least three parts, the axially outer parts having a second elastomeric compound having a maximum value of tan (δ), denoted tan (δ) max, strictly less than 0.060, and at least a part of the second layer, axially in (Continued)

contact with at least an axially outer part having a third compound with modulus G* greater than 1.2 MPa and at least 5% less than the first elastomeric compound and a maximum value of tan (δ), tan (δ)max, between 0.060 and 0.120.

16 Claims, 2 Drawing Sheets

(52) U.S. Cl.
  CPC ... *B60C 11/0075* (2013.01); *B60C 2011/0016* (2013.01); *B60C 2011/0025* (2013.01)

(56) References Cited

U.S. PATENT DOCUMENTS

| | | | |
|---|---|---|---|
| 2004/0069386 A1* | 4/2004 | Janajreh | B60C 9/20 152/152.1 |
| 2010/0018618 A1* | 1/2010 | Moorhead | B60C 11/00 152/209.5 |
| 2012/0285590 A1* | 11/2012 | Sandstrom | B60C 1/0016 152/209.5 |
| 2014/0000773 A1 | 1/2014 | Volk et al. | |

FOREIGN PATENT DOCUMENTS

| | | | | |
|---|---|---|---|---|
| EP | 2522530 A1 | | 11/2012 | |
| GB | 1255952 A | * | 12/1971 | ........... B60C 1/0016 |
| GB | 1255952 A | * | 12/1971 | ........... B60C 1/0016 |
| JP | 11-129713 A | | 10/1997 | |
| JP | 2005-015691 A | | 1/2005 | |
| JP | 2012-111269 A | | 6/2012 | |

\* cited by examiner

TIRE COMPRISING A TREAD MADE UP OF SEVERAL ELASTOMERIC COMPOUNDS

This application is a 371 national phase entry of PCT/EP2013/075243, filed 2 Dec. 2013, which claims benefit of French Patent Application No. 1261828, filed 10 Dec. 2012, the entire contents of which are incorporated by reference for all purposes.

BACKGROUND

1. Field

The present disclosure relates to a tire with a radial carcass reinforcement, and more particularly a tire intended for fitting to vehicles carrying heavy loads and travelling at sustained speeds, such as lorries, tractors, trailers or buses, for example.

2. Description of Relate Art

In the tires of heavy goods vehicles, the carcass reinforcement is generally fixed on either side in the area of the bead and is surmounted radially by a crown reinforcement composed of at least two layers, superimposed and formed of threads or cords which are parallel in each layer and crossed from one layer to the next making angles in the range between 10° and 45° with the circumferential direction. The said working layers forming the working reinforcement may be further covered by at least one layer, called the protective layer, formed by reinforcing elements which are advantageously metallic and extensible and are called elastic. It may also comprise a layer of metal threads or cords having low extensibility, forming an angle in the range from 45° to 90° with the circumferential direction, this ply, called the triangulation ply, being radially located between the carcass reinforcement and the first crown ply, referred to as the working ply, formed by parallel threads or cords lying at angles not exceeding 45° in absolute value. The triangulation ply forms a triangulated reinforcement with at least the said working ply, this reinforcement having low deformation under the various stresses which it undergoes, the triangulation ply essentially serving to absorb the transverse compressive forces acting on all the reinforcing elements in the crown area of the tire.

In the case of tires for "heavy-duty" vehicles, just one protective layer is usually present and its protective elements are, in the majority of cases, oriented in the same direction and with the same angle in absolute value as those of the reinforcing elements of the radially outermost and thus radially adjacent working layer. In the case of construction plant tires intended for running on more or less undulating ground, the presence of two protective layers is advantageous, the reinforcing elements being crossed from one layer to the next and the reinforcing elements of the radially internal protective layer being crossed with the inextensible reinforcing elements of the radially external working layer adjacent to the said radially internal protective layer.

Radially on the outside of the crown reinforcement is the tread usually made up of polymeric materials intended to come into contact with the ground in the contact patch in which the tire makes contact with the ground.

Cords are said to be inextensible when the said cords, under a tensile force equal to 10% of the breaking force, exhibit a relative elongation of at most 0.2%.

Cords are said to be elastic when the said cords exhibit, under a tensile force equal to the breaking load, a relative elongation at least equal to 3% with a maximum tangent modulus of less than 150 GPa.

The circumferential direction of the tire, or longitudinal direction, is the direction corresponding to the periphery of the tire and defined by the direction in which the tire runs.

The axis of rotation of the tire is the axis about which it turns in normal use.

A radial or meridian plane is a plane containing the axis of rotation of the tire.

The circumferential mid-plane, or equatorial plane, is a plane which is perpendicular to the axis of rotation of the tire and divides the tire into two halves.

The transverse or axial direction of the tire is parallel to the axis of rotation of the tire. An axial distance is measured in the axial direction. The expression "axially on the inside of or axially on the outside of, respectively" means "of which the axial distance, measured from the equatorial plane, is respectively less than or greater than".

The radial direction is a direction that intersects the axis of rotation of the tire and is perpendicular thereto. A radial distance is measured in the radial direction. The expression "radially on the inside of or radially on the outside of, respectively" means "of which the radial distance, measured from the axis of rotation of the tire, is respectively less than or greater than".

Certain present-day tires, referred to as "road tires", are intended to run at high speed and over increasingly long journeys, because of improvements to the road network and the growth of motorway networks worldwide. Unquestionably, the set of conditions in which a tire of this type is required to run enables the distance covered to be increased because there is less tire wear; however, the endurance of the tire, and particularly that of the crown reinforcement, is adversely affected.

This is because stresses are present in the crown reinforcement; more particularly, there are shear stresses between the crown layers, combined with a significant rise in the operating temperature at the ends of the axially shortest crown layer, resulting in the appearance and propagation of cracks in the rubber at the said ends. This problem exists in the case of edges of two layers of reinforcing elements, the said layers not necessarily being radially adjacent.

In order to limit excessive temperature increases in the crown of the tire, the materials of which the tread is made are advantageously chosen to have hysteresis losses suited to the operating conditions of the tire.

Moreover, in order to improve the endurance of the crown reinforcement of the type of tire being studied, solutions relating to the structure and quality of the layers and/or profiled elements of rubber compounds which are positioned between and/or around the ends of plies and, more particularly, the ends of the axially shortest ply, have already been provided.

In order to improve the resistance to degradation of rubber compounds located in the vicinity of the edges of the crown reinforcement, patent FR 1 389 428 recommends the use, in combination with a low-hysteresis tread, of a rubber profiled element covering at least the sides and marginal edges of the crown reinforcement and composed of a rubber compound with low hysteresis.

In order to avoid separations between crown reinforcement plies, patent FR 2 222 232 teaches the coating of the reinforcement ends with a pad of rubber whose Shore A hardness is different from that of the tread surmounting the said reinforcement, and greater than the Shore A hardness of the profiled element of rubber compound placed between the edges of the crown reinforcement plies and the carcass reinforcement.

French application FR 2 728 510 proposes arranging, on the one hand between the carcass reinforcement and the crown reinforcement working ply radially closest to the axis of rotation an axially continuous ply formed of inextensible metal cords making with the circumferential direction an angle at least equal to 60° and of which the axial width is at least equal to the axial width of the shortest working crown ply and, on the other hand, between the two working crown plies an additional ply formed of metallic elements oriented substantially parallel to the circumferential direction.

French application WO 99/24269 further proposes, on each side of the equatorial plane and in the immediate axial continuation of the additional ply of reinforcing elements substantially parallel to the circumferential direction, that the two working crown plies formed of reinforcing elements crossed from one ply to the next be coupled over a certain axial distance and then uncoupled using profiled elements of rubber compound over at least the remainder of the width that the said two crown plies have in common.

This improvement in the endurance of tires means that the possibility of retreading when the tread has worn away can at least be contemplated. Specifically, where there is a desire to retread the tire after the tread has worn away, in order to optimize the use of the new tread the tire that is to be retreaded must not be in too advanced a state of ageing.

In order to increase the life of the tires still further, it is common practice to choose polymeric materials that have improved wear resistance properties from which to make the tread. Because such materials usually have an adverse effect on hysteresis properties it is also known practice to make the tread of a tire from a radial superposition of two different materials in order to obtain a wearing properties-hysteresis compromise that is satisfactory for the applications envisaged.

Such tires are, for example, described in document U.S. Pat. No. 6,247,512. That document describes the superposition of two layers of materials to form the tread, the external material coming into contact with the ground being notably better performing in terms of wear whereas the internal material has hysteresis properties that allow the increases in temperature of the tire in the crown region to be limited.

It is also known practice to modify the internal layer of such treads in order to combat irregular wear of the said tread that occurs notably after the first layer that forms the exterior surface of the tread of the new tire has worn away. Such internal layers of the tread may thus comprise axially outer parts made up of more rigid materials. Such tires are, for example, described in patent applications JP2007/196864 and JP2009/286317.

However, it is found that such treads are less favorable in terms of the hysteresis properties of the tire and therefore in terms of the properties of endurance and rolling resistance.

SUMMARY

The inventors therefore set themselves the task of being able to provide tires that can run over an ever greater distance before retreading needs to be envisaged, with the properties of endurance and of rolling resistance maintained or even improved.

This object has been achieved according to an embodiment of the invention using a tire with a radial carcass reinforcement, comprising a crown reinforcement, itself capped radially by a tread connected to two beads by two sidewalls, the said tread being made up of at least two radially superposed layers of elastomeric compounds, a first layer, forming the radially outer part of the tread, consisting of a first elastomeric compound having a modulus $G^*$ greater than 1.8 MPa, a second layer of elastomeric compounds radially on the inside of and in contact with the said first layer of elastomeric compound consisting of at least three parts, the axially outer parts of the said second layer consisting of a second elastomeric compound having a maximum value of tan ($\delta$), denoted tan($\delta$)max, strictly less than 0.060, and at least a part of the said second layer, axially in contact with at least an axially outer part consisting of a third elastomeric compound having a value of the modulus $G^*$ greater than 1.2 MPa and at least 5% less than that of the first elastomeric compound and a maximum value of tan ($\delta$), denoted tan ($\delta$)max, of between 0.060 and 0.120.

According to one preferred embodiment of the invention, the maximum value of tan ($\delta$), denoted tan ($\delta$)max, of the third compound is less than 0.100.

The loss factor, tan($\delta$), is a dynamic property of the layer of rubber compound. It is measured on a viscosity analyser (Metravib VA4000) according to Standard ASTM D 5992-96. The response of a test specimen consisting of two cylindrical pellets each 2 mm thick and one centimeter in diameter is recorded (the test specimen is made from samples taken from a tire mid-way up the height of the layer concerned as close as possible to the region of the equatorial plane in a region that is thick enough to be able to form the test specimen), the specimen being subjected to simple alternating sinusoidal shear loadings at a frequency of 10 Hz, at a temperature of 60° C. The sweep covers an amplitude of deformation from 0.1 to 50% peak to peak (on the outbound cycle) then from 50% to 1% peak to peak (on the return cycle). The results made use of are the complex dynamic shear modulus ($G^*$) and the loss factor tan($\delta$). For the outward cycle, the maximum value of tan($\delta$) observed, denoted tan($\delta$)$_{max}$, is indicated.

The rolling resistance is the resistance appearing when the tire rolls, and reveals the increase in temperature of the said tire. It is thus represented by the hysteresis losses associated with the deformation of the tire during one revolution. The values of tan($\delta$) of the materials used are measured at 10 Hz between 30 and 100° C. in order to incorporate the effect of the various frequencies of deformation brought about by the revolving of the tire. The value of tan($\delta$) at 60° C. thus corresponds to an indication of the rolling resistance of the tire when it is being run.

The various measurements are taken on new tires which have not yet done any running.

The inventors were first of all able to demonstrate that the combination of a first elastomeric compound having a modulus $G^*$ greater than 1.8 MPa as the material of the thread that comes into contact with the ground and of a radially inner second layer consisting of two elastomeric compounds as described hereinabove leads to a satisfactory compromise between the properties of wear resistance and the properties of endurance and of rolling resistance of the tire.

What happens is that the first elastomeric compound of which the first layer of the tread is made has a rigidity which gives it satisfactory wear performance.

The said at least part of the said second layer that is axially in contact with at least an axially outer part combines properties of rigidity and of hysteresis of the third elastomeric compound which will, on the one hand, be able to contribute towards performance in terms of rolling resistance and, on the other hand, provide the reinforcement of the tire with satisfactory protection after the first layer has worn away and thus allow the tire to be retreaded.

Such elastomeric compounds corresponding to the third elastomeric compound are elastomeric compounds based on natural rubber or on synthetic polyisoprene with a majority of cis-1,4 chains and possibly on at least one other diene elastomer and of a reinforcing filler consisting:

(i) either of a white filler of the silica and/or alumina type having SiOH and/or AlOH surface functions, selected from the group formed by precipitated or pyrogenic silicas, aluminas or aluminosilicates, with a specific surface area in the range between 120 and 180 m²/g, used in a proportion greater than or equal to 40 phr, and less than or equal to 70 phr, (ii) or of a blend of carbon black having a CTAB specific surface area of between 65 and 105 m²/g in a proportion greater than or equal to 15 phr and less than or equal to 28 phr and of a white filler described in (i), in which the overall content of filler is greater than or equal to 40 phr and less than or equal to 70 phr and the content in phr of white filler is greater than or equal to the content of carbon black in phr minus 5.

The CTAB specific surface area is determined according to Standard NFT 45-007 (November 1987, method B).

If a clear filler or white filler is used, a coupling and/or coating agent, chosen from agents known to those skilled in the art, must be used. Examples of preferred coupling agents that may be mentioned are sulphurized alkoxysilanes of the bis-(3-trialkoxysilylpropyl) polysulphide type, and of these, notably, the bis(3-triethoxysilylpropyl) tetrasulphide marketed by Degussa under the trade names Si69 for the pure liquid product and X50S for the solid product (blended 50/50 by weight with N330 black). Examples of coating agents that may be mentioned are fatty alcohol, alkylalkoxysilane such as hexadecyltrimethoxy or triethoxy silane marketed by Degussa under the trade names Si116 and Si216 respectively, diphenylguanidine, polyethylene glycol, and silicone oil, modified by means of the OH or alkoxy functions if required. The coating and/or coupling agent is used in a proportion of ≥1/100 and ≤20/100 by weight to the filler, and preferably in the range from 2/100 to 15/100 if the clear filler forms the whole of the reinforcing filler and in the range from 1/100 to 20/100 if the reinforcing filler is formed by a blend of carbon black and clear filler.

Other examples of reinforcing fillers, having the morphology and SiOH and/or AlOH surface functions of the materials of the silica and/or alumina type described above and suitable for use according to the invention in total or partial replacement of these, that may be mentioned include carbon blacks modified either during synthesis by the addition of a silicon and/or aluminium compound to the oil supplied to the furnace, or after synthesis by the addition of an acid to an aqueous suspension of carbon black in a sodium silicate and/or aluminate solution so as to coat at least part of the surface of the carbon black with SiOH and/or AlOH functions. Some non-limiting examples of this type of carbonated filler with SiOH and/or AlOH surface functions that may be mentioned are the CSDP fillers described at Conference No. 24 of the ACS Meeting, Rubber Division, Anaheim, Calif., 6-9 May 1997, and those mentioned in patent application EP-A-0 799 854.

If a clear filler is used as the sole reinforcing filler, the properties of hysteresis and cohesion are obtained by using a precipitated or pyrogenic silica or a precipitated alumina or an aluminosilicate with a CTAB specific surface area in the range from 120 to 180 m²/g. Some non-limiting examples of this type of filler that may be mentioned are the silicas: KS404, marketed by Akzo, Ultrasil VN2 or VN3 and BV3370GR marketed by Degussa, Zeopol 8745 marketed by Huber, Zeosil 175MP or Zeosil 1165MP marketed by Rhodia, HI-SIL 2000 marketed by PPG, etc.

Among the diene elastomers that may be used in a blend with natural rubber or a synthetic polyisoprene with a majority of cis-1,4 chains, mention may be made of polybutadiene (BR), preferably with a majority of cis-1,4 chains, stirene-butadiene copolymer (SBR) solution or emulsion, butadiene-isoprene copolymer (BIR), or even stirene-butadiene-isoprene terpolymer (SBIR). These elastomers may be elastomers modified during polymerization or after polymerization by means of branching agents such as divinylbenzene or star forming agents such as carbonates, tin halogens and silicon halogens, or alternatively by means of functionalizing agents causing oxygenated carbonyl, carboxyl functions or an amine function to be grafted on to the chain or at the end of the chain, by the action of dimethyl- or diethylamino-benzophenone for example. In the case of blends of natural rubber or synthetic polyisoprene with a majority of cis-1,4 chains with one or more diene elastomers, mentioned above, the natural rubber or synthetic polyisoprene is preferably used in a majority proportion and more preferably in a proportion of more than 70 phr.

The choice of the second elastomeric compound which constitutes the axially outer parts of the second radially inner layer of the tread allows performance to be improved appreciably in terms of rolling resistance. The choice of this second elastomeric compound that makes it possible to obtain the desired hysteresis properties usually leads to properties in terms of cohesion that are not very favorable to tire wear performance. The axially outer parts of the second layer of the tread are thus advantageously defined in such a way that they do not come into contact with the ground throughout the life of the tire.

Within the meaning of the invention, the cohesion of a rubber compound is assessed from stress measurements by establishing a force/elongation at breakage curve.

The breaking stresses (in MPa) and the elongations at break (in %) are also measured. The tensile measurements for determining the breakage properties are carried out at a temperature of 60° C.±2° C. and under standard hygrometry conditions (50±5% relative humidity), according to French Standard NF T 40-101 (December 1979).

Moreover, it is found that the elastomeric compounds corresponding to the third elastomeric compound, as described hereinabove, have relatively poor curing properties in so far as they are not well suited to rapid curing of the tire. Because the axially outer parts of the second layer are present in the region of the tire that is coldest during curing and therefore decisive either in terms of curing temperature or in terms of curing time, this weakness of the third elastomeric compound can be amortized. A more rapid curing time is notably favorable to the overall hysteresis properties of the tire which are improved in terms of rolling resistance; indeed it is known that the hysteresis properties of the compounds are impaired as a result of longer curing.

The reduction in the curing time and/or curing temperature are even more favorable in terms of the industrial production costs of the tire.

The properties of an elastomeric compound in terms of curing are usually determined from the rheological properties of the compound.

The measurements are carried out at 150° C. with an oscillating disc rheometer, according to Standard DIN 53529-part 3 (June 1983). The change in the rheometric torque as a function of time describes the change in the stiffening of the composition as a result of the vulcanization reaction. The measurements are processed in accordance with Standard DIN 53529 part 2 (March 1983): $t_i$ is the induction period, that is to say the time necessary for the start of the vulcanization reaction; $t\alpha$ (for example $t_{95}$) is the time necessary to achieve a conversion of $\alpha$ %, that is to say $\alpha$ % (for example 95%) of the difference between the minimum and maximum torques. The conversion rate constant, denoted K (expressed in $min^{-1}$), which is first order, calculated between 30% and 80% conversion, which makes it possible to assess the vulcanization kinetics, is also measured.

Contrary to one of the known solutions mentioned hereinabove which sought to combat irregular tread wear through a choice of assembly of materials from which to make the tread, the inventors took the stance of seeking a performance compromise disregarding the irregularity of tread wear as the effects of this can notably be alleviated by tread pattern choices known to those skilled in the art.

According to one preferred embodiment of the invention, the first and third elastomeric compounds have better cohesion than the second compound. This cohesion advantage manifests itself in an elongation at break value at 60° C. that is at least 15% higher than that of the second compound.

According to this preferred embodiment of the invention, the inventors have been able to demonstrate that the first and third compounds make it possible to limit the propagation of cracks which may begin in the tread and notably in the bottoms of the tread patterns where stones for example may become wedged.

It is also possible to envisage improving the hysteresis performance of the tire by increasing the volume of the third compound at the expense of that of the first compound.

One advantageous alternative form of the invention also anticipates that the said second layer of elastomeric compound consists of at least five parts, the central part consisting of a fourth elastomeric compound having an electric resistivity per unit volume p such that $\log(\rho)$ is less than 6, the axially outer parts of the said second layer consisting of the said second elastomeric compound, and at least the intermediate parts of the said second layer axially in contact with the central part and axially outer parts consisting of the said third compound.

The electric resistivity per unit volume is measured statically in accordance with Standard ASTM D 257.

Selecting the fourth elastomeric compound of which the central part of the second layer of the tread is made for its electrical resistivity properties makes it possible to ensure that any electrostatic charge that may build up on the vehicle is discharged. The inventors have also been able to demonstrate that, in particular, selecting the second and third elastomeric compounds from which the axially outer parts and the intermediate parts of the second layer are formed leads, for the desired properties, to formulations that are unfavorable to electrical conductivity.

According to a more particularly advantageous embodiment of the invention, the fourth compound of which the central part of the second layer is made may be identical to the first compound of the radially outermost first layer.

According to a preferred embodiment of the invention, the axial width of the central part of the second layer is less than 10% of the axial width of the said second layer.

For preference also, the axial width of an intermediate part is between 65% and 95% of the axial width of the said second layer.

Finally, the axial width of an axially outer part of the second layer is greater than 5% of the axial width of the said second layer.

Advantageously also, with the tire comprising at least two longitudinal grooves, the second elastomeric compound of which the axially outer parts of the second layer are made is present only axially on the outside of the grooves.

According to an advantageous alternative form of the invention, the ratio of the volume of the first layer of the first elastomeric compound to the sum of the volumes of the first and second layers of elastomeric compounds is between 20 and 85% and advantageously between 50 and 85%.

One advantageous alternative form of the invention even provides for the presence of a third layer consisting of at least a fifth elastomeric compound radially on the inside of the said second layer and in contact therewith, the fifth elastomeric compound having a maximum value of $\tan (\delta)$, denoted $\tan (\delta)$max, strictly less than 0.060.

The presence of this third layer may make it possible to reduce temperature rises of the tread still further during the desired use of the tire and therefore favour the performance of the tire in terms of endurance.

The presence of this third layer may even make it possible to reduce the operating temperature of the tire in the crown region in order to allow the rolling resistance of the tire to be lowered.

According to one more particularly advantageous embodiment of the invention, the fifth compound of which the third layer is made may be identical to the second compound of the second layer.

More particularly, in the case of a tire the tread pattern of which consists of parallel ribs separated by grooves, the third layer of elastomeric compound is advantageously discontinuous. It is then preferably at least interrupted under the grooves.

According to this last embodiment, it is advantageously possible to regroove the tread pattern before envisaging retreading without the risk of seeing the said third layer of elastomeric compound become visible at the surface of the tread.

When the second layer comprises a central part consisting of a fourth elastomeric compound having an electrical resistivity per unit volume $\rho$ such that $\log(\rho)$ is less than 6, the third layer is advantageously also interrupted radially under the central part of the second layer by the said fourth compound. According to such an embodiment of the invention, the tread thus comprises, around the equatorial plane, a region of electrical conductivity from the crown reinforcement as far as the surface of the tread.

Advantageously, according this last embodiment, the ratio of the volume of the fifth elastomeric compound to the sum of the volumes of the three layers of elastomeric compounds is between 5 and 15%.

According to the invention, the abovementioned volume measurements are performed on tires in the new condition which have not been driven on and which therefore do not display any tread wear.

According to one embodiment of the invention, the crown reinforcement of the tire is formed of at least two working crown layers of inextensible reinforcing elements, crossed from one layer to the other, forming, with the circumferential direction, angles of between 10° and 45°.

According to other embodiments of the invention, the crown reinforcement further comprises at least one layer of circumferential reinforcing elements.

One embodiment of the invention also makes provision for the crown reinforcement to be supplemented radially on the outside by at least one additional layer, referred to as a protective layer, of reinforcing elements, called elastic, oriented with respect to the circumferential direction at an angle of between 10° and 45° and in the same direction as the angle formed by the inextensible elements of the working layer radially adjacent to it.

According to any one of the embodiments of the invention mentioned hereinabove, the crown reinforcement may further be supplemented, radially on the inside between the carcass reinforcement and the radially internal working layer closest to the said carcass reinforcement, by a triangulation layer of inextensible metal reinforcing elements made of steel forming with the circumferential direction an angle greater than 60° and in the same direction as the direction of the angle formed by the reinforcing elements of the radially closest layer of the carcass reinforcement.

BRIEF DESCRIPTION OF DRAWINGS

Other details and advantageous features of embodiments of the invention will become apparent hereinafter from the description of some exemplary embodiments of the invention which are given with reference to FIGS. 1 and 2, which depict.

DETAILED DESCRIPTION OF SPECIFIC EMBODIMENTS

The figures are not represented to scale in order to make them easier to understand. The figures represent only a half-view of a tire, which extends symmetrically with respect to the axis XX', which represents the circumferential median plane, or equatorial plane, of a tire.

Figure 1:
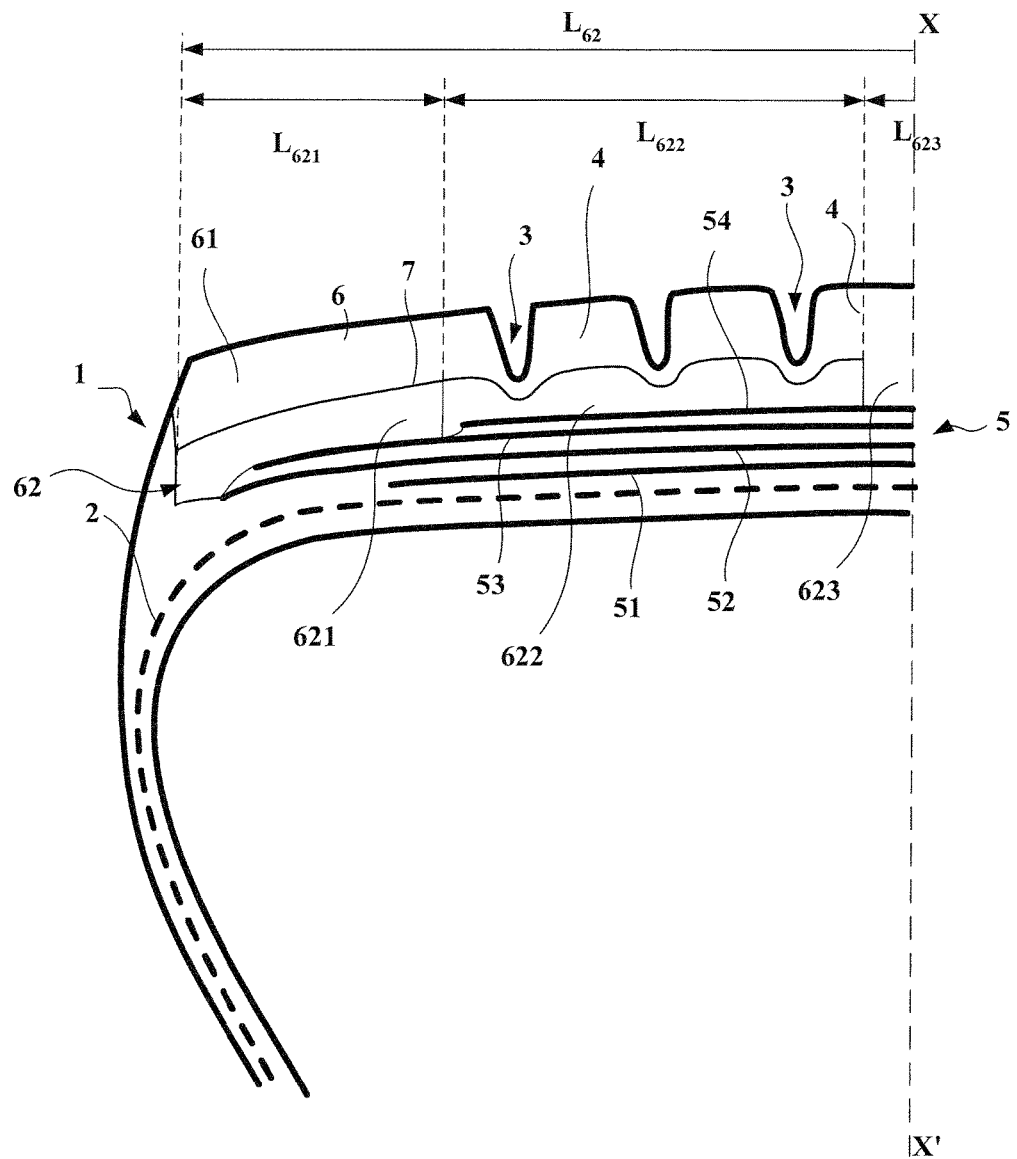
in FIG. 1, a meridian view of a tire layout according to a first embodiment of the invention, in FIG. 2, a meridian view of a tire layout according to a second embodiment of the invention.

In FIG. 1, the tire 1, of size 315/70 R 22.5, comprises a radial carcass reinforcement 2 anchored in two beads around bead wires, not depicted in the drawings. The carcass reinforcement 2 is faulted of a single layer of metal cords. The carcass reinforcement 2 is hooped by a crown reinforcement 5, itself capped by a tread 6. The tread comprises grooves 3 forming ribs 4.

The low regions and the beads of the tire 1 are notably not depicted in the figures.

In FIG. 1, the crown reinforcement 5 is formed radially from the inside to the outside:
- of a triangulation layer 51 formed of non-wrapped inextensible 9.35 metal cords which are continuous across the entire width of the ply and oriented at an angle of 65°,
- of a first working layer 52 formed of non-wrapped inextensible 11.35 metal cords which are continuous across the entire width of the ply, oriented at an angle of 18°,
- of a second working layer 53 formed of non-wrapped inextensible 11.35 metal cords which are continuous across the entire width of the ply, oriented at an angle of 18° and crossed with the metal cords of the first working layer,
- of a protective layer 54 formed of non-wrapped elastic 6.35 metal cords which are continuous across the entire width of the ply, oriented at an angle of 18° in the same direction as the metal cords of the working layer 53.

According to the invention, the tread 6 is made up of a radially outer first layer 61 which comes into contact with the ground and of a radially inner layer 62.

The layer 61 is made up of the first elastomeric compound having a modulus G* equal to 2 MPa.

The layer 62, radially on the inside of the layer 61, is made up of three elastomeric compounds.

The second elastomeric compound forming the axially outer parts 621 has a maximum value of tan (δ), denoted tan(δ)max, equal to 0.045.

The third elastomeric compound forming the axially intermediate parts 622 has a modulus G* equal to 1.65 MPa and a maximum value of tan (δ), denoted tan (δ) max, equal to 0.080.

The central part 623 of the layer 62 is made up of the first elastomeric compound and has an electrical resistivity ρ such that log(ρ) is equal to 3.

The ratio of the volume of the layer 61 of the first elastomeric compound to the sum of the volumes of the layers 61 and 62 is equal to 70%.

The axial width $L_{623}$ of the central part 623 of the second layer 62 is equal to 5% of the axial width $L_{62}$ of the said second layer.

The axial width $L_{622}$ of an intermediate part 622 is equal to 75% of the axial width $L_{62}$ of the said second layer 62.

The axial width $L_{621}$ of an axially outer part 621 of the second layer 62 is equal to 20% of the axial width $L_{62}$ of the said second layer 62.

Figure 2:
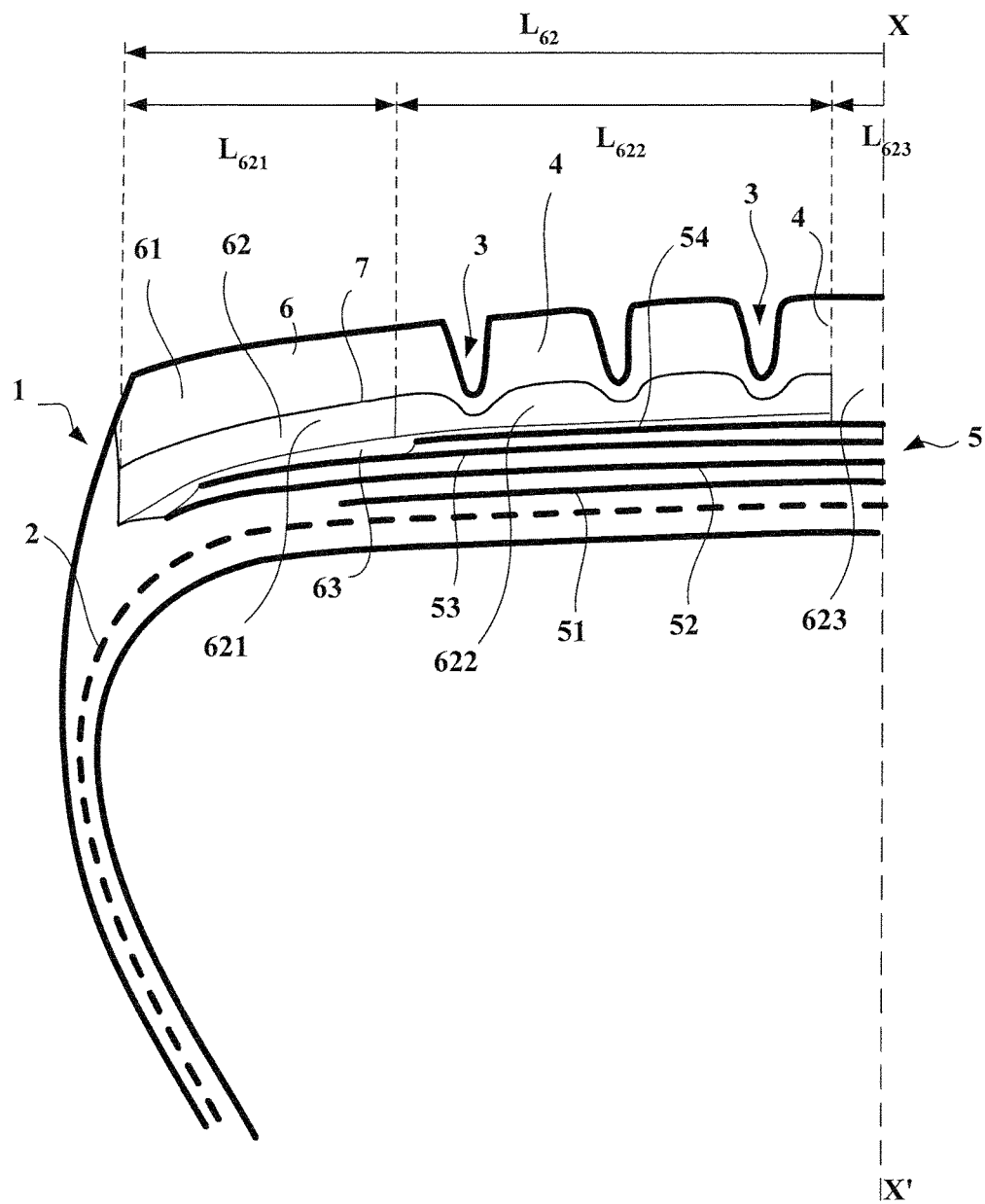

FIG. 2, according to an alternative form of embodiment of the invention, shows a tire 1 similar to that of FIG. 1 and which differs therefrom through the presence of a third layer 63. This layer 63 is placed in contact with the crown reinforcement and radially on the inside of the layer 62. The thickness of this layer 63 positioned notably radially under the grooves to is sufficiently insignificant to allow grooving steps before having to envisage the steps of retreading in order to recreate the tread pattern without the risk of revealing the layer 63 at the surface of the tread. The layer 63 is interrupted at the equatorial plane by the presence of the first compound in order to create continuity in the radial direction with the central part 623 of the layer 62 from the crown reinforcement as far as the surface of the tread.

The layer 63 is made up of the second elastomeric compound and therefore has a maximum value of tan (δ), denoted tan(δ)max, equal to 0.045.

The ratio of the volume of the layer 63 to the sum of the volumes of the three layers 61, 62 and 63 is equal to 10%.

Three tires were produced based on the three elastomeric compounds described hereinbelow with some of their properties.

|  | Compound A | Compound B | Compound C |
|---|---|---|---|
| NR | 60 | 100 | 100 |
| BR | 40 | | |
| N234 | 54 | | |
| N683 | | | 35 |
| Silica (165) m2/G | | 50 | 10 |
| N330/Coupling agent | | 5/5 | 1/1 |
| Resin/hardener | 0.25/0.3 | | |
| Anti Oxidant | 2 | 2.5 | 1 |
| Processing agent | 3 | | |
| PARAFFIN | 1 | 1 | |
| STEARIC ACID | 1.5 | 2.5 | 1.5 |
| ZnO | 3 | 3 | 4.5 |
| SULPHUR | 1.1 | 1.5 | 1.5 |
| Accelerator (CBS) | 1.1 | 1.8 | 1.4 |
| G*50% cc/60° C./10 Hz (MPa) | 2 | 1.65 | 1.4 |
| $\tan(\delta)_{max}$ | 0.180 | 0.080 | 0.045 |
| Resistivity - log(ρ) | 3 | 10.4 | 10 |
| T95 at 150° C. | 11 | 19.7 | 9 |

The first tire is a reference tire R produced to a configuration close to the depiction of FIG. 1 but corresponding to conventional productions as described hereinabove, the radially inner layer being formed of a single elastomeric compound. It combines a compound A present radially on the outer side of the tread and a radially inside compound C. The volume of compound C is defined in the conventional way by a person skilled in the art so that the operating temperature of the tire corresponds to the driving envisaged with such a tire. In this particular instance, the volume of compound C represents 15% of the sum of the volumes of compounds A and C.

A first tire $T_1$ according to an embodiment of the invention and, more particularly, in the case of FIG. 1, combines, to foul' the tread, the compound A which forms the radially outer part and therefore the layer 61 and the central part 623 of the radially inner layer 62, compound B, which forms the axially intermediate parts 622 of the radially inner layer 62 and compound C which forms the axially outer parts 621 of the radially inner layer 62.

The ratio of the volume of compound B to the sum of the volumes of compounds A, B and C is equal to 17%.

The ratio of the volume of compound C to the sum of the volumes of the three compounds A, B and C is equal to 13%.

The second tire $T_2$ produced according to an embodiment of the invention can be likened to that of FIG. 2. The tread of the tire $T_2$ is similar to that of the tire $T_1$ and further comprises a layer 63 consisting of compound C and compound A around the circumferential plane.

The ratio of the volume of compound B to the sum of the volumes of compounds A, B and C is equal to 12%.

The ratio of the volume of compound C to the sum of the volumes of three compounds A, B and C is equal to 18%.

In order to make a comparison, similar tests were run with all three tires.

The first tests involved evaluating the distance covered by the tires before they needed to be retreaded.

The tests are carried out under defined load and speed conditions to lead to tread wear and tread attack of the reference tire R1 that allow it to be retreaded after a certain distance, assigned the value 100, covered under the said conditions of this test. The wearing performance is evaluated on a heavy vehicle when driving on an open road over paths representative of the usage to which heavy vehicles are conventionally put. Values lower than 100 express inferior wear performance.

The results obtained are given in the following table:

|  | Tire R1 | Tire T1 | Tire T2 |
|---|---|---|---|
| Wear | 100 | 99 | 98 |

These results show that the tires according to the invention allow running that is substantially equivalent to the reference tire before retreading is needed.

Rolling resistance measurements were also carried out on each of the tires under identical running conditions. The results of the measurements are shown in the following table; they are expressed in kg/t, with a value of 100 assigned to tire R. Values below 100 express superior performance in terms of rolling resistance.

| Tire R | Tire T1 | Tire T2 |
|---|---|---|
| 100 | 92 | 89 |

These values demonstrate the benefit of using the compound B to limit the rolling resistance of the tire.

Comparing tires T1 and T2 shows that the presence of a layer 63 may have a significant benefit in teens of rolling resistance while at the same time maintaining satisfactory properties in terms of wear and attack.

Furthermore, because the layer 63 has a small thickness at least under the grooves, it is possible to carry out a step of regrooving in order to recreate grooves before having to envisage the step of retreading. From this standpoint, the presence of the layer of compound 63 therefore does not penalize the tire T2 in comparison with the tire T1.

The invention claimed is:

1. A tire with a radial carcass reinforcement, comprising:
a crown reinforcement,
a tread radially capping the crown reinforcement, and connected to two beads by two sidewalls, comprising at least two radially superposed layers of elastomeric compounds, wherein a first layer, forming the radially outer part of the tread, consists of a first elastomeric compound having a modulus G* greater than 1.8 MPa, wherein a second layer of elastomeric compounds radially on the inside of and in contact with the first layer of elastomeric compound, consists of at least three parts, wherein at least two of the parts of the second layer consist of different elastomeric compounds than one another and than the first elastomeric compound of the first layer, wherein axially outer parts of the second layer consist of a second elastomeric compound having a maximum value of tan (δ), denoted tan(δ)max, strictly less than 0.060, wherein at least another part of the second layer, which is axially in contact with at least at least one of the axially outer parts consists of a third elastomeric compound having a value of the modulus G* greater than 1.2 MPa and at least 5% less than that of the first elastomeric compound and a maximum value of tan (δ), denoted tan (δ)max, of between 0.060 and 0.120 at 60° C., wherein the second elastomeric compound has a modulus G* which is less than the modulus G* of the first elastomeric compound and is less than the modulus G* of the third elastomeric compound.

2. The tire according to claim 1, wherein the second layer of elastomeric compound consists of at least five parts, wherein a central part consists of a fourth elastomeric compound having an electric resistivity per unit volume ρ such that log(ρ) is less than 6, wherein the axially outer parts of the second layer consist of the second elastomeric compound, and wherein at least intermediate parts of the second layer axially in contact with the central part and axially outer parts consist of the third compound.

3. The tire according to claim 2, wherein the first elastomeric compound and the fourth elastomeric compound are identical.

4. The tire according to claim 1, wherein a ratio of a volume of the first layer of elastomeric compound to the sum of the first and second layers that make up the tread is between 50 and 85%.

5. The tire according to claim 1, wherein an axial width of a central part of the second layer is less than 10% of the axial width of the second layer.

6. The tire according to claim 1, wherein an axial width of an intermediate part of the second layer is between 65% and 95% of the axial width of the second layer.

7. The tire according to claim 1, wherein an axial width of an axially outer part of the second layer is greater than 5% of the axial width of the said second layer.

8. The tire according to claim 1, wherein the tire further comprises a third layer consisting of at least a fifth elastomeric compound radially on the inside of the second layer and in contact therewith, and wherein the fifth elastomeric compound has a maximum value of tan (δ), denoted tan (δ)max, strictly less than 0.060.

9. The tire according to claim 8, wherein a ratio of the volume of the fifth elastomeric compound to a sum of the volumes of the three layers of elastomeric compounds is between 5 and 15%.

10. The tire according to claim 2, wherein a ratio of a volume of the first layer of elastomeric compound to the sum of the first and second layers that make up the tread is between 50 and 85%.

11. The tire according to claim 2, wherein an axial width of a central part of the second layer is less than 10% of the axial width of the second layer.

12. The tire according to claim 2, wherein an axial width of an intermediate part of the second layer is between 65% and 95% of the axial width of the second layer.

13. The tire according to claim 2, wherein an axial width of an axially outer part of the second layer is greater than 5% of the axial width of the said second layer.

14. The tire according to claim 2, wherein the tire further comprises a third layer consisting of at least a fifth elastomeric compound radially on the inside of the second layer and in contact therewith, and wherein the fifth elastomeric compound has a maximum value of tan (δ), denoted tan (δ)max, strictly less than 0.060.

15. The tire according to claim 14, wherein a ratio of the volume of the fifth elastomeric compound to a sum of the volumes of the three layers of elastomeric compounds is between 5 and 15%.

16. A tire with a radial carcass reinforcement, comprising:
a crown reinforcement,
a tread radially capping the crown reinforcement, and connected to two beads by two sidewalls, comprising at least two radially superposed layers of elastomeric compounds, wherein a first layer, forming the radially outer part of the tread, consists of a first elastomeric compound having a modulus G* greater than 1.8 MPa, wherein a second layer of elastomeric compounds radially on the inside of and in contact with the first layer of elastomeric compound, consists of at least three parts, wherein at least two of the parts of the second layer consist of different elastomeric compounds than one another and than the first elastomeric compound of the first layer, wherein axially outer parts of the second layer consist of a second elastomeric compound having a maximum value of tan (δ), denoted tan(δ)max, strictly less than 0.060, wherein at least another part of the second layer, which is axially in contact with at least at least one of the axially outer parts consists of a third elastomeric compound having a value of the modulus G* greater than 1.2 MPa and at least 5% less than that of the first elastomeric compound and a maximum value of tan (δ), denoted tan (δ)max, of between 0.060 and 0.120 at 60° C., and wherein the axially outer parts of the second layer are recessed relative to the remainder of the second layer such that the axially outer arts of the second layer do not come into contact with the ground during the life of the tire.

* * * * *